United States Patent Office 2,952,555
Patented Sept. 13, 1960

2,952,555
COATING COMPOSITIONS
Ales M. Kapral, 3950 Lake Shore Drive, Chicago, Ill.
No Drawing. Filed Sept. 16, 1957, Ser. No. 683,939
2 Claims. (Cl. 106—243)

This invention relates to compositions suitable for coating porous materials to render them water-repellant, and to the production thereof. More particularly this invention relates to solutions and emulsions of water insoluble soaps in volatile organic solvents for application to porous materials.

Polyvalent metallic soaps are generally insoluble in water but are soluble or dispersible in organic liquids, such as hydrocarbons and halogenated hydrocarbons. In such organic solvents they form suspensions or gels which even at low concentration are very viscous and in many cases rubbery. Such dispersions or suspensions are difficult or impossible to apply to porous materials and cannot be sprayed on but must be applied with rollers or other complicated apparatus. Such dispersions in organic solvents are expensive to prepare and to use, and they form a powdery coating instead of a film on porous materials.

It is an object of this invention to prepare solutions, dispersions and emulsions of polyvalent metal soaps in organic solvents which can be readily emulsified and diluted with water. It is another object of this invention to provide dispersions of polyvalent metal soaps of low viscosity which may readily be applied to porous material by spraying, painting or similar techniques. It is a further object of this invention to provide dispersions of polyvalent metal soaps in organic aqueous emulsions wherein the solvents are volatile and may be readily evaporated after application to porous material. It is an additional object of this invention to provide methods of treating porous material, such as wood, wallboard, concrete, plaster, cloth, yarn, paper, fabrics and the like to render them water-repellant. Another object is to provide methods of preparing dispersions and emulsions of polyvalent metal soaps in organic solvents and aqueous emulsions which are of low viscosity suitable for application to porous materials. These and other objects will be apparent from and are achieved in accordance with the following disclosure.

Broadly the present invention concerns dispersions of polyvalent metallic soaps in organic solvents containing ammonia or volatile amines to lower the viscosity of the dispersion so that the compositions are thin and free-flowing. Such compositions are easily diluted with water to form emulsions which have low viscosity and which may be readily applied to porous material. The polyvalent metal soaps to which this invention pertains include salts of metals, such as aluminum, with fatty acids such as stearic and palmitic acids. Generally the organic acids may be any of the hydrocarbon carboxylic acids containing 10 or more carbon atoms and include the fatty acids from capric acid to acids containing 20 or more carbon atoms, such as undecylic, lauric, myristic, palmitic, margaric, stearic, oleic, linoleic, arachidic, behenic, lignoceric, cerotic, montanic, melissic and ricinoleic acids. Also included are resin acids derived from rosin and tall oil containing 10 or more carbon atoms, such as abietic acid, levopimaric acid, d-pimaric, and dehydroabietic acid.

The organic solvents in which the polyvalent metal soaps are dispersed or dissolved include the aliphatic, alicyclic and aromatic hydrocarbons and halogenated aromatic, alicyclic and aliphatic hydrocarbons. In this group are the petroleum ether fractions, naphtha, kerosene, gasoline, cyclohexane, toluene, xylene, benzene, methylchloroform, methylene dichloride, methylene dibromide, carbon tetrachloride, trichloroethylene, dichloroethylene, ethylene dichloride, chlorobenzene and related compounds. The organic solvent should have a boiling point in the range of about 40° to about 150° C. and, if combustible, should have a flash point not lower than 25° F.

As indicated above, dispersions of polyvalent metal soaps in hydrocarbon or halogenated hydrocarbon solvents are highly viscous and sometimes waxy or rubberlike. An important feature of the present invention is the discovery that small quantities of ammonia, either gaseous or aqueous, or of volatile organic amines, such as methylamine, dimethylamine, trimethylamine, ethylamine, diethylamine, triethylamine, and similar volatile amines having boiling points below 100° C., will reduce the viscosity of the dispersions markedly whereby dispersions or solutions are obtained having viscosities not substantially greater than the viscocity of the organic solvent alone. The amount of volatile basic nitrogen compound, that is ammonia and volatile organic amines, necessary to achieve the results of this invention may vary over fairly wide ranges. In order to lower the viscosity of the polyvalent metal soap in the organic solvent a minimum of about 4 moles of ammonia or amine per mole of polyvalent metallic soap is usually required. Best results are obtained when 20 to 50 moles of ammonia or amine per mole of polyvalent metallic soap are used. Larger excesses of ammonia or amine may be used up to about 100 moles of ammonia or amine per mole of polyvalent metallic soap, but generally the results with quantities of ammonia or amine greater than 100 moles per mole of soap are not satisfactory. Apparently in high concentration the ammonia reacts with the polyvalent metallic soap to precipitate oxides or hydrates of the polyvalent metal which form gels which are different from the gels obtained prior to the addition of ammonia. Such gels will not emulsify with water and therefore are unsatisfactory for the purposes of this invention.

The amount of polyvalent metallic soap to organic solvent may also vary over fairly wide ranges. Generally 10 to 30 parts of polyvalent metallic soap per 100 parts of organic solvent will form satisfactory compositions. If more than 30 parts of polyvalent metallic soap are used, the product ordinarily becomes too viscous for general use. Less than 10 parts of polyvalent metallic soap per 100 parts of organic solvent gives compositions which do not contain enough soap to form satisfactory water-repellant compositions. The amount of water which may be added to form aqueous emulsions of the polyvalent metallic soaps and organic solvents may likewise vary over fairly wide ranges. Usually it may vary from equal parts of water and organic solvent to 10 parts of water per part of organic solvent. Preferably 3 volumes to 5 volumes of water per volume of organic solvent are preferred. In other words, the liquid media in an aqueous organic emulsion should contain from 100 parts of organic solvent and 900 parts of water to 500 parts of organic solvent and 500 parts of water with the preferred range being 200 to 300 parts of organic solvent mixed with 700 to 800 parts of water. Such aqueous emulsions are of relatively low viscosity, can be poured rapidly and are readily sprayed on porous material. The solvent and water will evaporate rapidly leaving a residue of polyvalent metallic soap of the porous material to provide water-repellency.

The invention is disclosed in further detail by means of the following examples which are provided solely for the purposes of illustration and are not intended to limit the invention. It will be apparent to those skilled in the art that numerous modifications in quantities of materials, times, temperatures and the like may be made without departing from the invention. Likewise equivalent materials may be used in lieu of those described within the limits disclosed herein. Throughout the application amounts of materials are given in parts by weight and temperatures in degrees centigrade.

*Example 1*

30 parts of aluminum stearate and 200 parts of petroleum solvent containing about 20% aromatics are mixed in a closed vessel and heated under pressure of 1.5 atmosphere to 112° C. After 30 minutes of stirring under these conditions the mass becomes thick and jellylike. At this point ammonia gas is passed through the dispersion of aluminum stearate in the hydrocarbon solvent. Soon after the first portion of ammonia is added the mass becomes thin and readily absorbs further quantities of ammonia. After approximately 3 parts of gaseous ammonia are added the addition is stopped and stirring is continued while the temperature is allowed to fall to about 80° C. At this point the pressure is released and 770 parts of water at 40–50° C. are stirred into the thin solution of aluminum stearate in solvent. A thick white emulsion is formed which is very stable and which can be sprayed or brushed on porous material, drying in less than one minute at ordinary temperature and leaving a water-repellant film of aluminum stearate.

*Example 2*

Into a mixture of 190 parts of petroleum naphtha solvent and 10 parts of hexylene glycol are stirred 30 parts of aluminum palmitate. The mixture is stirred in a closed vessel under pressure of 1.5 atmosphere at 110° C. for 30 minutes, forming a thick gel. Then 10 parts of 28% aqueous ammonia are added with stirring and the suspension becomes a thin liquid which is slightly yellowish in color. The temperature is decreased to 80° C. and the pressure released. Then 800 parts of water at 50° C. are added to form an emulsion in the form of a milk-white liquid.

*Example 3*

To 200 parts of methylchloroform in a closed vessel are added 30 parts of aluminum stearate. The mixture is heated to 115° C. under 1.5 atmospheres' pressure and stirred for 30 minutes to form a thick jelly-like dispersion. Then 3 parts of ammonia gas are introduced beneath the surface of the suspension and stirring is continued. There is thus formed a thin liquid suspension of aluminum stearate in the solvent which is slightly yellow in color. About 300 parts of water at 60° C. are added to the suspension at 80° C. and stirring is continued to form a creamy emulsion having a milk-like appearance. This emulsion when sprayed on paper dries very rapidly and the solvent and water are completely evaporated in 30 seconds.

*Example 4*

A mixture of 100 parts of ethylene dichloride and 200 parts of toluene are heated in an open vessel to a temperature just below the boiling point of the solvent mixture. Then 60 parts of aluminum stearate are added with good agitation with a formation of a jelly-like dispersion. After about an hour, mixing is no longer possible and the mass is allowed to stand for another hour and then treated with stirring with 15 parts of 28% aqueous ammonia water in small portions. After about 2 parts of ammonia water are added, the mass becomes thin and further quantities of ammonia water are easy to mix in. The resulting liquid has very low viscosity and slight yellow color. After cooling to room temperature, the mass becomes white and has a consistency similar to that of butter. When mixed with warm water (40–50° C.) it forms a stable liquid emulsion of low viscosity which will dry on spraying in about 40 seconds.

*Example 5*

20 parts of 28% ammonia water and 20 parts of water are mixed in a closed vessel. 30 parts of aluminum stearate are added and the mixture heated to 115° C. in the closed vessel under pressure with good agitation for 1 hour. Then the pressure is released and the temperature brought below 50° C. At this point 200 parts of toluene are added with stirring to form a thick dispersion. Then 730 parts of warm (40–50° C.) water are added and mixing continued until a white emulsion is produced. This substance will spray-dry on wood within 1 minute.

*Example 6*

300 parts of aliphatic hydrocarbon solvent, boiling range 350–400° F., flash point 129° F., and 100 parts of aluminum stearate are mixed and heated to 100° C. until the aluminum stearate dissolves, forming a rubbery gel. Then 10 parts of concentrated ammonia water (30%) are added in small portions, causing the gel to liquify. 300 parts of aliphatic hydrocarbon solvent are added and then 400 to 600 parts of cold water are stirred in. The resulting emulsion is sufficiently thin to be poured and can be sprayed in ordinary equipment.

What is new and is desired to be obtained by Letters Patent of the United States is:

1. An aqueous composition of matter consisting essentially of an aluminum soap of a hydrocarbon carboxylic acid containing at least 10 carbon atoms, a volatile inert organic solvent selected from the group consisting of hydrocarbons and halogenated hydrocarbons having a boiling point in the range of 40° C. to 150° C., a basic volatile nitrogen compound selected from the group consisting of ammonia and organic amines and water, wherein the aluminum soap comprises 0.5% to 15% of the composition, the organic solvent comprises 10% to 50% of the composition and the amount of basic nitrogen compound is in the range of 4 moles to 50 moles per mole of aluminum soap, said aqueous emulsion being in a form which can be easily sprayed or applied to surfaces of porous material.

2. A method of preparing an aqueous emulsion as defined in claim 1 which comprises mixing an aluminum soap of a hydrocarbon corboxylic acid containing at least 10 carbon atoms with an organic solvent selected from the group consisting of hydrocarbons and halogenated hydrocarbons having a boiling point in the range of 40° C. to 150° C. at a temperature of 80° to 120° C. in the presence of an organic basic nitrogen compound selected from the group consisting of ammonia and organic amines in a concentration of 4 moles to 50 moles per mole of aluminum soap to form a thin dispersion of said soap in said organic solvent, cooling the dispersion to a temperature below the boiling point of water and adding thereto warm water at a temperature above about 40° C. to form an aqueous emulsion containing the aluminum soap and the organic solvent.

References Cited in the file of this patent

UNITED STATES PATENTS

| | | |
|---|---|---|
| 1,073,129 | Horn | Sept. 16, 1913 |
| 2,032,528 | Dolid | Mar. 3, 1936 |
| 2,214,358 | Williams | Sept. 10, 1940 |
| 2,223,158 | Licata | Nov. 26, 1940 |
| 2,308,988 | Mathes | Jan. 19, 1943 |
| 2,364,391 | Schiller | Dec. 5, 1944 |
| 2,494,331 | Cunder | Jan. 10, 1950 |
| 2,663,653 | Zimmerman | Dec. 22, 1953 |

FOREIGN PATENTS

| | | |
|---|---|---|
| 540,090 | Great Britain | Oct. 31, 1941 |
| 557,411 | Great Britain | Nov. 19, 1943 |